US008499463B2

(12) United States Patent
Arvidsson

(10) Patent No.: US 8,499,463 B2
(45) Date of Patent: Aug. 6, 2013

(54) SAW BOX FOR PREVENTING CHAIN SHOT FROM A BROKEN SAWCHAIN

(75) Inventor: Hans Arvidsson, Grangärde (SE)

(73) Assignee: Log Max AB, Grangärde (SE)

( * ) Notice: Subject to any disclaimer, the term of this patent is extended or adjusted under 35 U.S.C. 154(b) by 74 days.

(21) Appl. No.: 12/522,414

(22) PCT Filed: Jan. 16, 2008

(86) PCT No.: PCT/SE2008/050047

§ 371 (c)(1),
(2), (4) Date: Dec. 24, 2009

(87) PCT Pub. No.: WO2008/088284

PCT Pub. Date: Jul. 24, 2008

(65) Prior Publication Data

US 2010/0088904 A1 Apr. 15, 2010

(30) Foreign Application Priority Data

Jan. 18, 2007 (SE) ....................................... 0700103

(51) Int. Cl.
*B23D 57/02* (2006.01)
*B27B 17/00* (2006.01)

(52) U.S. Cl.
USPC .................................. 30/381; 30/382; 30/379

(58) Field of Classification Search
USPC ............................................ 30/122, 378–387
See application file for complete search history.

(56) References Cited

U.S. PATENT DOCUMENTS 2,731,048 A * 1/1956 Seizert ............................ 30/385
2,860,671 A * 11/1958 Wilder ............................ 30/500
2,879,814 A * 3/1959 Scott ............................... 30/382
3,496,971 A * 2/1970 Hale ............................... 30/381
3,565,138 A 2/1971 Albright
3,604,479 A 9/1971 Jordan
3,636,996 A 1/1972 Lanz
3,672,412 A * 6/1972 Albright ......................... 83/801

(Continued)

FOREIGN PATENT DOCUMENTS

CA 2674626 A1 * 7/2008
DE 4137187 5/1992

(Continued)

OTHER PUBLICATIONS

International Search Report for corresponding application No. PCT/SE2008/050047 completed Mar. 13, 2008.

(Continued)

*Primary Examiner* — Jason Daniel Prone
(74) *Attorney, Agent, or Firm* — Renner, Otto, Boisselle & Sklar LLP

(57) ABSTRACT

A saw box for preventing chain shot from a broken sawchain of a chainsaw, the saw box including a stationary shield that covers a rear section of the saw. The shield has an end surface that extends between an outer surface and an inner surface of the shield and has such hardness and is designed with a convex curvature of such a radius that one part of the broken sawchain that comes to an external location during operation of the saw can slide around the end surface in an essentially unhindered manner in a direction towards the inner surface.

16 Claims, 4 Drawing Sheets

U.S. PATENT DOCUMENTS

| | | | | | |
|---|---|---|---|---|---|
| 3,949,817 | A | * | 4/1976 | Rice | 30/381 |
| 4,041,606 | A | * | 8/1977 | Thompson | 30/381 |
| 4,048,722 | A | * | 9/1977 | Howard | 30/386 |
| 4,219,059 | A | * | 8/1980 | Albright | 30/381 |
| 4,272,889 | A | * | 6/1981 | Scott et al. | 30/382 |
| 4,513,799 | A | * | 4/1985 | Lindblom et al. | 30/384 |
| 4,649,644 | A | * | 3/1987 | Huddleston | 30/383 |
| 4,658,507 | A | * | 4/1987 | Hazen | 30/382 |
| 4,760,646 | A | * | 8/1988 | Siegler | 30/382 |
| 4,805,308 | A | | 2/1989 | Ritola | |
| 4,821,415 | A | * | 4/1989 | Kress | 30/383 |
| 4,916,818 | A | * | 4/1990 | Panek | 30/383 |
| 4,945,637 | A | * | 8/1990 | Anderson | 30/122 |
| 5,077,896 | A | * | 1/1992 | Rivera | 30/122 |
| 5,088,197 | A | * | 2/1992 | Anderson | 30/122 |
| 5,101,872 | A | | 4/1992 | Scheuren | |
| 5,561,908 | A | * | 10/1996 | Leini | 30/383 |
| 5,987,786 | A | * | 11/1999 | Gibson et al. | 30/387 |
| 6,148,547 | A | * | 11/2000 | Seigneur et al. | 30/387 |
| 6,397,452 | B1 | * | 6/2002 | Frosberg et al. | 30/387 |
| 6,944,957 | B2 | * | 9/2005 | Donnerdal et al. | 30/386 |
| 6,976,299 | B2 | * | 12/2005 | Seigneur | 30/383 |
| 2006/0107804 | A1 | | 5/2006 | Annala | |
| 2007/0289147 | A1 | * | 12/2007 | Irwin | 30/381 |
| 2011/0088816 | A1 | * | 4/2011 | Arvidsson | 144/4.1 |
| 2011/0265912 | A1 | * | 11/2011 | Arvidsson | 144/343 |

FOREIGN PATENT DOCUMENTS

| | | | | |
|---|---|---|---|---|
| EP | 1528852 | | | 5/2005 |
| FR | 2554757 | A1 | * | 5/1985 |
| RU | 2009131320 | A | * | 2/2011 |
| SE | 530792 | C2 | * | 9/2008 |
| SU | 8163 | | | 2/1929 |
| SU | 245684 | | | 1/1969 |
| SU | 905073 | | | 2/1982 |
| SU | 1326186 | | | 7/1987 |
| WO | 02071833 | | | 9/2002 |
| WO | 2004/006654 | | | 1/2004 |
| WO | 2005/060735 | | | 7/2005 |
| WO | WO 2008088284 | A1 | * | 7/2008 |
| WO | WO 2009128779 | A1 | * | 10/2009 |

OTHER PUBLICATIONS

Official Decision of Grant for corresponding Russian Patent Application No. 2009131320, dated Jan. 19, 2012.

Supplementary European Search Report dated May 6, 2013 for corresponding application No. EP 08 705 319.5.

* cited by examiner

SAW BOX FOR PREVENTING CHAIN SHOT FROM A BROKEN SAWCHAIN

This application is a national phase of International Application No. WO 2008/088284 filed Jul. 24, 2008 and published in the English language.

TECHNICAL AREA

The invention concerns an arrangement for the capture of a broken sawchain of a chainsaw with a guide bar arranged to pivot, comprising a stationary shield that forms a part of a saw box and that covers a rear section of the saw.

BACKGROUND

Sawchains of chainsaws mounted on, for example, harvester equipment for the felling and processing of tree trunks often run with high peripheral speeds (>50 m/s) around the guide bar. Although chain breakages occur relatively seldom, they can cause serious personal injury if one or more links are freed and are thrown as a projectile from a broken part of the chain, in the manner shown highly approximately and schematically illustrated in the sequence 1-6 in FIGS. 5 and 6 of the attached drawings. This type of chain breakage or chain shot can be considered to be particularly dangerous, since the operator of the equipment often sits in the possible direction that such a chain shot may take. Authorities have for this reason issued regulations concerning protection from chain shot for the type of chainsaw described.

In one form of protection from chain shot shown in EP 1 528 852 C, a protective wall is arranged that carries out a pivot motion together with the guide bar at the rear section of the latter, approximately in the manner that is shown by dot-dash lines in the attached FIG. 5. It may not always be possible, however, for such a protection from chain shot to prevent chain shot when it is used together with a chainsaw that, furthermore, has an external rear shield that forms a part of a saw box. There may in this case still be a risk that the broken part of the chain comes to a location outside of the shield and is ripped off by the edge of some opening, particularly when the guide bar is located at its swivelled out location.

DESCRIPTION OF THE INVENTION

One aim of the invention is to provide an arrangement of the type described in the introduction that reduces the risk for chain shot from a rear part of the chainsaw.

This is achieved through the characteristics that are specified in the attached patent claims.

According to a review of the invention, the shield has an end surface that extends between an outer surface and an inner surface of the shield and has such hardness and is designed with a convex curvature of such a large radius that a part of the broken sawchain that comes to an external location during operation of the saw can slide around the end surface in an essentially unhindered manner in a direction towards the inner surface.

Due to the hard end surface, the cutting links of the chain cannot cut into the surface in a manner that provides braking and which then rips them off, and due to the large radius there is no edge against which the free part of the chain, which has been thrown out with high speed, can be directly cut off or abruptly caught and ripped off. The magnitude of the radius furthermore results in only the tips and outer surfaces of the driving links and cutting links coming into contact with the end surface, while the thinner and possibly also weaker side links and the joints of the links do not come into contact with the end surface.

Through the arrangement being able to form an integrated part of the fixed shield or saw box for capturing the chain, an extra protection against chain shot will, furthermore, be made unnecessary on the pivoting saw mechanism.

If the shield according to one embodiment of the invention comprises a section in the form of a strap for capturing the chain, which section extends uninterrupted by openings along the shield, there is no risk of a released part of the chain becoming fixed at the edge of an opening of the shield, nor is there any risk that a released part become wound around in the shield and tangling with itself. It is, however, conceivable to allow the strap be interrupted by openings at a sufficiently large distance from the end surface, if these end surfaces are arranged, in any case, with the above-mentioned hardness and radius.

Other aims, characteristics and advantages of the invention are made clear by the claims and the following description of embodiments.

DETAILED DESCRIPTION OF EMBODIMENTS

Figure 1:
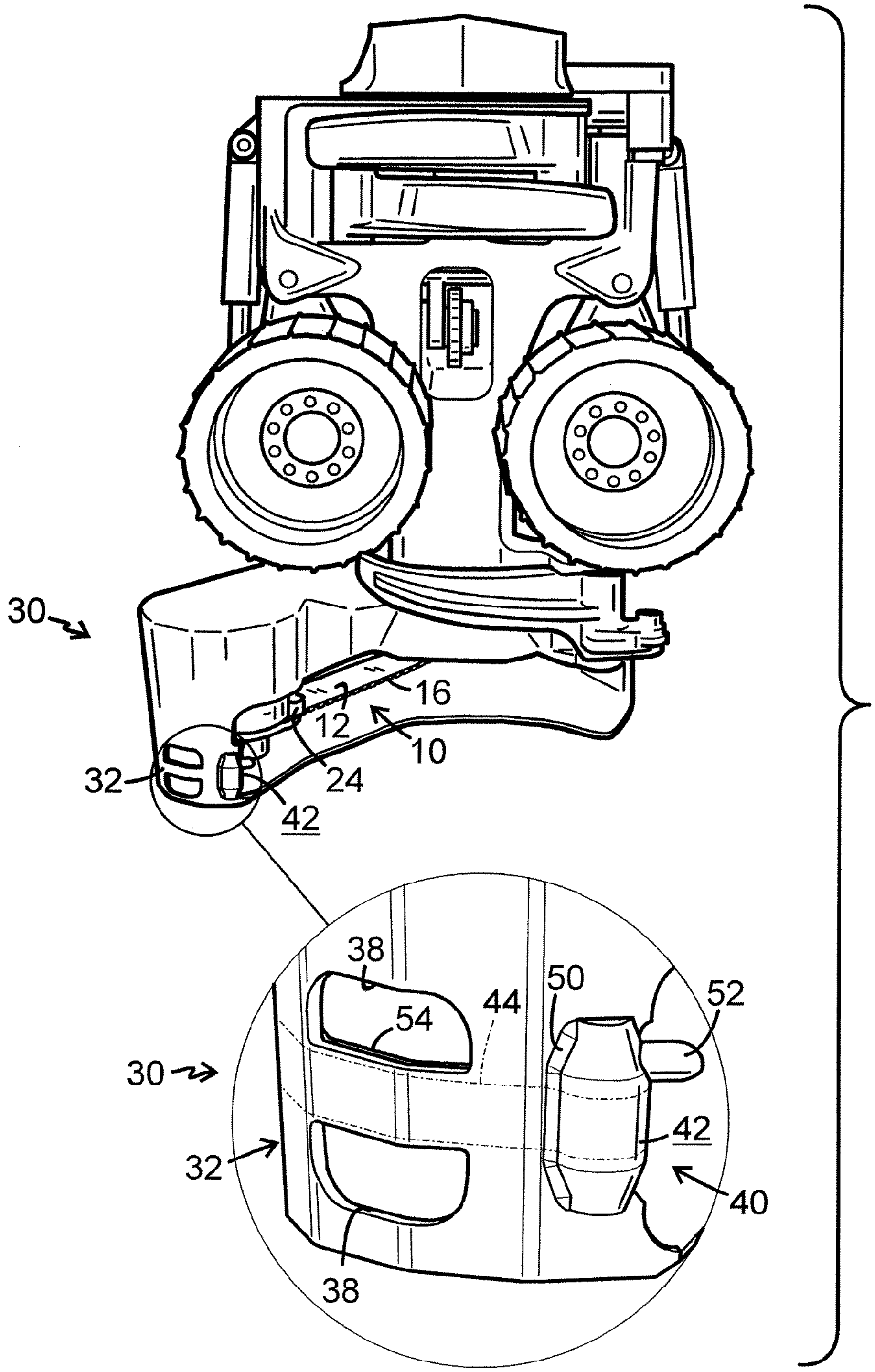
FIG. 1 is a view from the front of a harvester equipped with an arrangement according to the invention.

FIG. 1 shows a harvester of known type equipped with an arrangement according to the invention. The harvester has at its lower part a chainsaw 10 that is enclosed within a saw box, generally denoted by the reference number 30.

Figure 2:
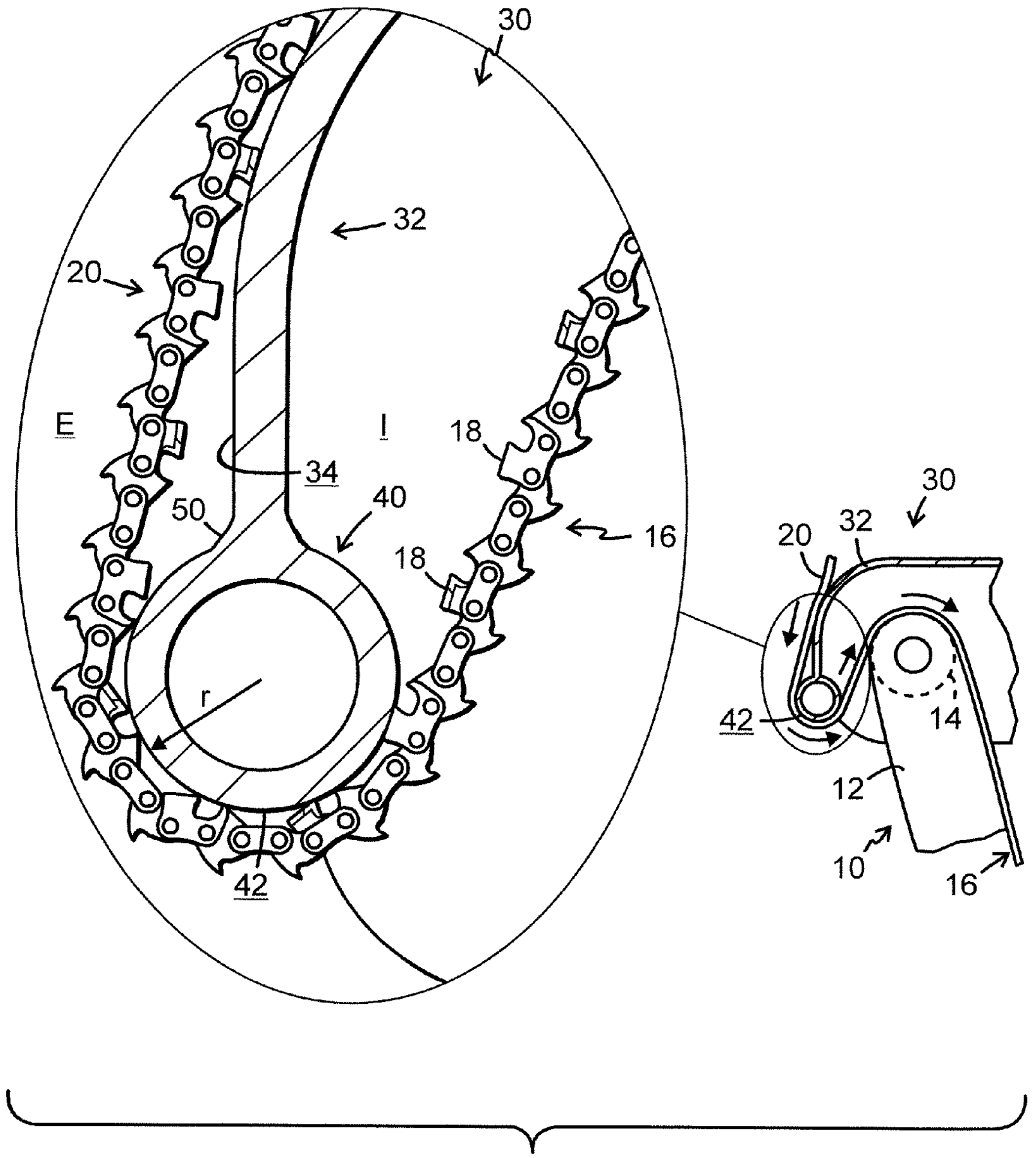
FIG. 2 is a schematic view in cross-section with broken away pieces of a chainsaw equipped with an arrangement according to the invention.

The chainsaw 10 has in a usual manner a guide bar 12 around which a sawchain 16 runs. The sawchain 16 is driven around the guide bar 12 by a motor (not shown in the drawings) in the saw box 30 via a drive 14 (seen in FIG. 2). During a cutting operation, a swivel mechanism, not shown in the drawings, pivots the guide bar 12 out from the saw box 30, while the sawchain 16, which runs around the guide bar 12 at high speed, cuts a tree trunk, not shown in the drawings, that is held by the harvester.

Figure 5:
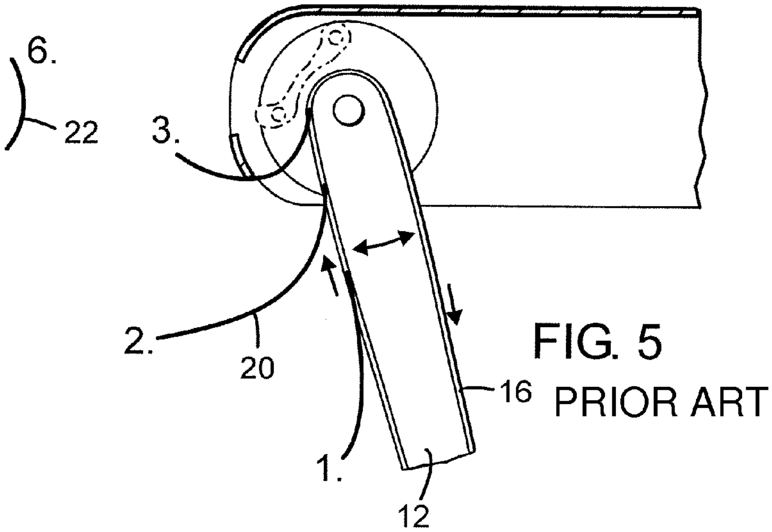
FIG. 5 PRIOR ART
FIGS. 5 and 6 are schematic views in cross-section that illustrate the breakage of a chain in the absence of an arrangement according to the invention.
Figure 6:
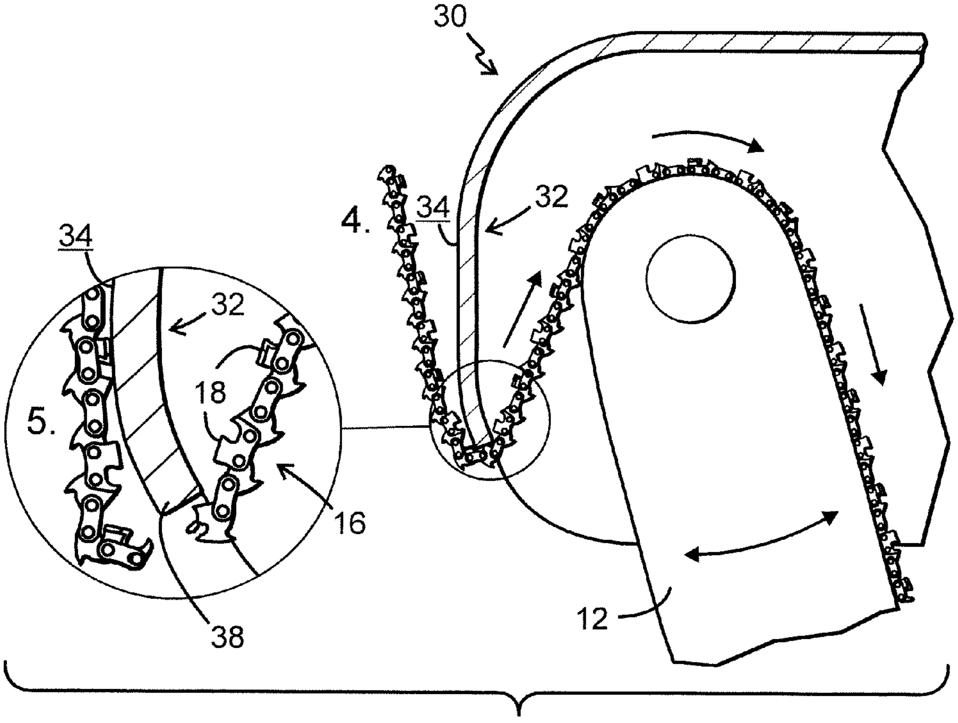
FIG. 6 PRIOR ART

As is illustrated schematically for the prior art technology shown in FIGS. 5 and 6, it can occur that the sawchain 16 breaks during operation. A free part of the chain 20 can then be thrown out from the guide bar 12 in approximately the manner that is suggested by the sequence 1-3. The section of chain 20 will collide at the position numbered 4 with an end edge 38 of a rear shield 32 of the saw box 30. Since the sawchain 16 at this time may be driven at a very large peripheral speed (>50 m/s) and with a high momentum of torque around the drive at the inner end of the saw, there is a serious risk that its free part 20, which is ejected at the position 5 with a speed that is just as high—or possibly as early as position 3 or 4 —be cut off or ripped off by its contact with the end edge 38, approximately in the manner that is shown in the enlarged region of FIG. 6. The part 22 released from the section of chain 20 subsequently risks being thrown out from the saw box 30 at high speed, becoming what is known as a "chain shot", approximately according to the position 6 in FIG. 5. Studies of saw boxes after chain breakage have confirmed that the process is approximately as it has been described above. Evidence for this includes the fact that traces are found of the cutting links 18 of the sawchain 16 on the end edge 38 of the shield 32, and, in some cases, on the external surface 34.

To return to FIGS. 1 and 2, the end surface 42 of the shield 32 has, in order to minimise the risk of chain shot of the type described above, been given such a large radius r in the plane of the sawchain and such a large hardness that the free part 20 of the sawchain 16 can slide around the end surface 42 in an essentially unhindered manner from an external location E of the shield 32 in the direction towards its inner surface I. An approximate typical minimum value for the radius may be 2.5 cm, and for the hardness 500 HB. Alternatively, the end surface 42 may have a hardness that is at least approximately 400 HB. It is also conceivable that the radius can be designed as a function of the hardness: the radius can be made higher as the hardness becomes lower,and vice versa. The large radius can be achieved by using a piece of rod or tube 40 that is fixed to the end of the shield 32 in a suitable manner, such as through a weld 50. The high value of hardness can be achieved through the choice of a suitable material, for example a steel quality of a hardening and tempering steel, and its heat treatment.

Figure 3:
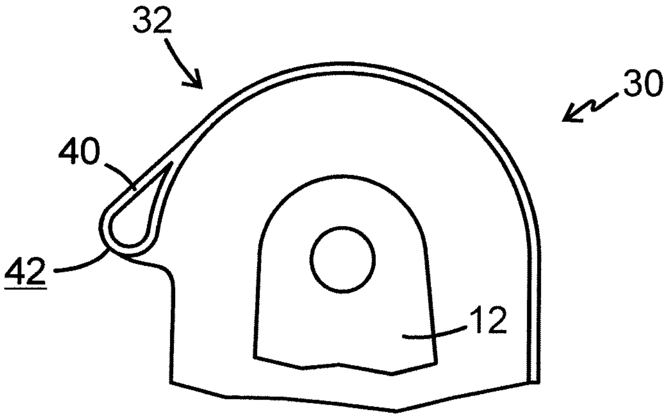
FIGS. 3 and 4 are schematic views in cross-section of variants of arrangements according to the invention.

The rod 40 may have beveled ends, as is shown in FIG. 1. There may also be formed on the rod 40 a resistance 52 for a protrusion 24 at the swivel mechanism of the guide bar 12 in order to limit the pivoting movement of the guide bar 12 outwards. The rod or tube 40 does not need to have a cylindrical cross-section: it may have, for example, a drop-formed cross-section as is illustrated in FIG. 3.

Figure 4:
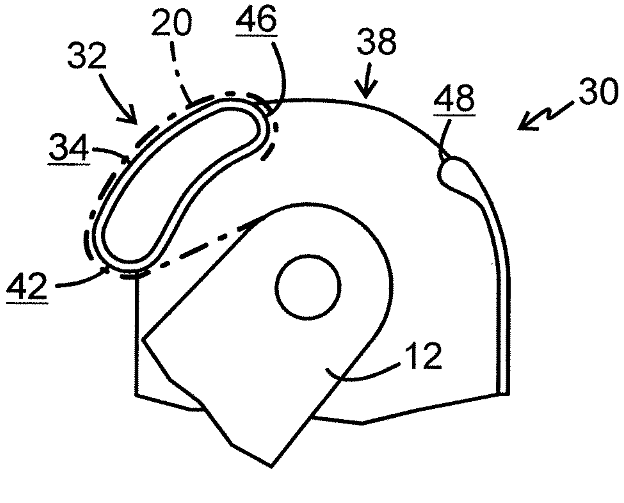

In order to reduce the risk that the free part of the sawchain 16 becomes attached at other edges at the outer surface of the shield 32, the shield 32 may have a section 44 with the form of a band or strap to capture the chain. This part extends uninterrupted between the openings 38 of the shield 32 (see FIG. 1). In other words, it can be ensured that these openings 38, which allow the exit of sawdust from the saw box 30, are arranged such that they do not extent beyond the plane of the sawchain 16, with a sufficiently large margin. Also the shield 32 or the part that has the form of a strap may be of a material with the hardness specified above, or possibly with a somewhat lower hardness, since the greatest contact pressure of the free part 20 of the chain is expected to arise after approximately one half of a revolution of the end surface 42. The shield 32 may be also reinforced with a hard strap 54 (see FIG. 1) on its inner surface. It is also conceivable, however, as is shown schematically in FIG. 4, to allow openings 38 (only one large opening is shown) in the shield 32 at the plane of the sawchain. The edges or end surfaces 46 of the openings that face the direction of motion of the sawchain may in a similar manner be designed with the large radius and high hardness described above. The first opening 38, however, should lie at such a great distance from the end surface 42 that the section 20 of chain does not risk becoming wound round in the saw box 30 and becoming tangled. Also the opposite end surfaces 48 may be curved or rounded in order to avoid the section 20 of chain becoming attached, if it should be expected to reach so far.

The detailed description given above if primarily intended to facilitate understanding, and no limitations of the invention are to be interpreted from this description. The modifications that are obvious for one skilled in the arts when reviewing the description can be carried out without deviation from the innovative concept or scope defined by the attached patent claims.

The invention claimed is:

1. A saw comprising a saw box for preventing chain shot from a broken sawchain of the saw, the saw box comprising:

a stationary shield configured to cover a rear part of the saw, wherein the shield has a fixed end surface that extends between an outer surface and an inner surface of the shield, the end surface being hardened or tempered steel having a hardness of at least approximately 400 HB and the end surface having a convex or rounded curvature having a radius of at least 2.5 cm, wherein the end surface is configured to allow a part of the broken sawchain that moves from the outer surface toward the inner surface to slide around the end surface in the direction towards the inner surface.

2. The saw according to claim 1, whereby the end surface is a part of a cylinder.

3. The saw according to claim 2, whereby the cylinder is a piece of rod or pipe that is fixed attached to the shield.

4. The saw according to claim 1, whereby the outer surface of the shield has a hardness that is at least approximately 400 HB.

5. The saw according to claim 1, whereby the shield comprises a band-shaped section that extends uninterrupted along the shield.

6. The saw according to claim 1, the saw further including a sawchain, wherein the end surface has the hardness and is formed with the rounded or convex curvature of such a radius that a part of the sawchain, when broken, that moves from the outer surface toward the inner surface can slide around the end surface in the direction towards the inner surface.

7. The saw according to claim 1, wherein the radius of the end surface is formed by a surface of a tubular member.

8. The saw according to claim 1, wherein the shield includes one or more openings that allow sawdust to exit the saw box.

9. A harvester comprising a harvester body and the saw of claim 1, the saw box being mounted to a lower part of the harvester body.

10. The harvester of claim 9, further comprising a drive and a sawchain, wherein the drive is configured to drive the sawchain at a speed of greater than 50 m/s.

11. A chainsaw comprising a saw box for preventing chain shot from a broken sawchain of the chainsaw, the saw box comprising:

a stationary shield configured to cover a rear part of the chainsaw, wherein the shield has a fixed end surface that extends between an outer surface and an inner surface of the shield, the end surface having a hardness and a convex curvature having a radius, wherein the end surface is configured to allow a part of the broken sawchain that moves from the outer surface toward the inner surface to slide around the end surface in the direction towards the inner surface, and wherein the radius of the end surface is formed by a surface of a tubular member.

12. The chainsaw of claim 11, wherein the radius of the end surface is at least 2.5 cm.

13. The chainsaw of claim 11, wherein the tubular member defines a convex surface having a minimum radius of 2.5 cm.

14. The chainsaw of claim 11, wherein the end surface is hardened or tempered steel having a hardness of at least approximately 400 HB.

15. A harvester comprising a harvester body and the chainsaw of claim 11, the saw box being mounted to a lower part of the harvester body.

16. The harvester of claim 15, further comprising a drive and a sawchain, wherein the drive is configured to drive the sawchain at a speed of greater than 50 m/s.

* * * * *

UNITED STATES PATENT AND TRADEMARK OFFICE

CERTIFICATE OF CORRECTION

PATENT NO. : 8,499,463 B2
APPLICATION NO. : 12/522414
DATED : August 6, 2013
INVENTOR(S) : Hans Arvidsson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this
Fifteenth Day of September, 2015

Michelle K. Lee

Michelle K. Lee
*Director of the United States Patent and Trademark Office*